United States Patent
Kondo et al.

(10) Patent No.: US 9,374,784 B2
(45) Date of Patent: *Jun. 21, 2016

(54) TERMINAL DEVICE, WIRELESS BASE STATION WIRELESSLY COMMUNICATING WITH THE SAME, AND WIRELESS COMMUNICATION SYSTEM USING TERMINAL DEVICE AND WIRELESS BASE STATION

(75) Inventors: Yoshihisa Kondo, Soraku-gun (JP); Hiroyuki Yomo, Soraku-gun (JP); Suhua Tang, Soraku-gun (JP); Sadao Obana, Soraku-gun (JP); Tetsuya Ito, Tokyo (JP); Koichi Yoshimura, Tokyo (JP); Masahito Iwai, Tokyo (JP); Toshiyasu Tanaka, Tokyo (JP); Hiroyuki Iizuka, Tokyo (JP)

(73) Assignees: ADVANCED TELECOMMUNICATIONS RESEARCH INSTITUTE INTERNATIONAL, Kyoto (JP); NEC COMMUNICATION SYSTEMS, LTD., Tokyo (JP)

( * ) Notice: Subject to any disclaimer, the term of this patent is extended or adjusted under 35 U.S.C. 154(b) by 210 days.

This patent is subject to a terminal disclaimer.

(21) Appl. No.: 14/001,060
(22) PCT Filed: Feb. 16, 2012
(86) PCT No.: PCT/JP2012/053612
§ 371 (c)(1),
(2), (4) Date: Aug. 22, 2013
(87) PCT Pub. No.: WO2012/114969
PCT Pub. Date: Aug. 30, 2012

(65) Prior Publication Data
US 2013/0329621 A1 Dec. 12, 2013

(30) Foreign Application Priority Data
Feb. 23, 2011 (JP) .............................. 2011-037306

(51) Int. Cl.
*G08C 17/00* (2006.01)
*H04W 52/02* (2009.01)

(52) U.S. Cl.
CPC ...... *H04W 52/0225* (2013.01); *H04W 52/0206* (2013.01); *H04W 52/0229* (2013.01)

(58) Field of Classification Search
CPC .............. H04W 52/0206; H04W 52/0229; H04W 52/0225
USPC ................................. 370/311, 318
See application file for complete search history.

(56) References Cited

U.S. PATENT DOCUMENTS 6,980,839 B2 12/2005 daCosta
7,756,548 B2 7/2010 Laroia et al.
(Continued)

FOREIGN PATENT DOCUMENTS

JP 2006-516374 A 6/2006
JP 2007-526655 A 9/2007
(Continued)

OTHER PUBLICATIONS

Japanese Office Action dated Jan. 27, 2015, issued in Japanese Application No. 2012-214812; w/English translation. (6 pages).
(Continued)

*Primary Examiner* — Chuong T Ho
(74) *Attorney, Agent, or Firm* — Westerman, Hattori, Daniels & Adrian, LLP

(57) ABSTRACT

A terminal device 2 transmits a wireless frame having a frame length or amplitude that represents the ID of a wireless base station 1 to be woken up to the wireless base station 1. The wireless base station 1 detects the wakeup ID from the frame length or amplitude of the wireless frame from the terminal device 2, and, if the detected wakeup ID is identical with its own ID, transitions from a sleep mode to an operating mode. In this case, the wireless frame is the same wireless frame as that transmitted and received by the wireless communication module of the terminal device 2 to and from the wireless base station 1.

16 Claims, 11 Drawing Sheets

(56) References Cited

U.S. PATENT DOCUMENTS

| | | | |
|---|---|---|---|
| 9,025,697 B2* | 5/2015 | Kondo | H04L 1/0083 375/295 |
| 2003/0117969 A1* | 6/2003 | Koo et al. | 370/318 |
| 2007/0146157 A1 | 6/2007 | Ramus | |
| 2007/0253468 A1 | 11/2007 | Pettersen et al. | |
| 2009/0052417 A1 | 2/2009 | Sakamoto et al. | |
| 2009/0067356 A1 | 3/2009 | Sakamoto et al. | |
| 2010/0150042 A1* | 6/2010 | Oh et al. | 370/311 |

FOREIGN PATENT DOCUMENTS

| | | |
|---|---|---|
| JP | 2009-510835 A | 3/2009 |
| JP | 2009-077375 A | 4/2009 |
| JP | 2009-232103 A | 10/2009 |
| WO | 2004/100503 A2 | 11/2004 |
| WO | 2010/002991 A1 | 1/2010 |

OTHER PUBLICATIONS

International Search Report dated May 22, 2012, issued in corresponding application No. PCT/JP2012/053612.

Mishra, Nilesh, et al., "Wake-on-WLAN", WWW 2006.

Ishida, Shigemi, et al., "A Multi-step Wake-up Scheme for Low-Power-Listening Wireless Communication System", IEICE Technical Report, Information Networks, 2008, vol. 107(525), p. 355-360. W/English abstract.

Japanese Office Action dated Nov. 11, 2014, issued in corresponding Japanese Application No. 2012-214812; w/English Translation. (7 pages).

* cited by examiner

| BIT SEQUENCE | FRAME LENGTH ($\mu$s) |
|---|---|
| 000000 | L=230 |
| 000001 | L=260 |
| 000010 | L=290 |
| ⋮ | ⋮ |
| 111110 | L=2120 |
| 111111 | L=2150 |

TBL1

| CUMULATIVE VALUE | BIT SEQUENCE |
|---|---|
| $22 \leq c \leq 24$ | 000000 |
| $25 \leq c \leq 27$ | 000001 |
| $28 \leq c \leq 30$ | 000010 |
| ⋮ | ⋮ |
| $211 \leq c \leq 213$ | 111110 |
| $214 \leq c \leq 216$ | 111111 |

TERMINAL DEVICE, WIRELESS BASE STATION WIRELESSLY COMMUNICATING WITH THE SAME, AND WIRELESS COMMUNICATION SYSTEM USING TERMINAL DEVICE AND WIRELESS BASE STATION

TECHNICAL FIELD

The present invention relates to terminal devices, wireless base stations wirelessly communicating with the same and wireless communication systems using such terminal devices and wireless base stations.

BACKGROUND ART

Wireless LANs (local area networks) are widely used in homes, offices and the like. As wireless LANs become widespread, a large number of access points (APs) are installed, which are normally powered on while in use even when no communication data is generated.

Since such "left-on" APs are not used in a majority of time, power is wasted.

In the field of sensor networking, approaches have been considered that use a wakeup receiver to wake up the receiving end of data only when communications are required.

Non-Patent Document 1 proposes an approach that uses 802.15.4 sensor motes that consume less power than wireless LAN cards to observe a wireless LAN channel of the same frequency and, when it detects radio waves from the transmitting source, wakes up the wireless LAN card of the terminal.

Patent Documents 1 to 3 and Non-Patent Document 2 propose approaches that use wakeup receivers that consume less power to wake up wireless LAN cards.

In each of Patent Documents 1 and 2 and Non-Patent Document 2, since the frequency of wakeup signals is different from the frequency for the wireless LAN, two antennas are required.

Patent Document 1: JP 2007-526655 A
Patent Document 2: WO 04/100503
Patent Document 3: U.S. Pat. Pub. No. 2007/0253468
Non-Patent Document 1: NiLesh Mishra, Kameswari Chebrolu, Bhaskaran Raman, Abhinav Pathak: Wakeon WLAN, WWW 2006
Non-Patent Document 2: Shigemi Ishida, Makoto Suzuki, Takashi Morito, Hiroyuki Morikawa: Multi-Step Wakeup Scheme for Low-Power-Listening Wireless Communication System, IEICE technical report, information networks, 107(525), p. 355-360, Feb. 28, 2008

DISCLOSURE OF THE INVENTION

A problem with the conventional art is that, since the frequency of wakeup signals is different from the frequency for the wireless LAN, an access point may not be woken up using wireless frames for the wireless LAN.

The present invention was made to solve this problem. An object of the invention is to provide a terminal device that is capable of activating a wireless base station using wireless frames of wireless communication techniques.

Another object of the present invention is to provide a wireless base station that is capable of receiving wireless frames of wireless communication techniques to be activated.

Yet another object of the present invention is to provide a wireless communication system including a terminal device that is capable of activating a wireless base station using wireless frames of wireless communication techniques.

According to an embodiment of the present invention, a terminal device includes an antenna, a wireless module and a wakeup transmitter. The wireless module performs wireless communication via the antenna. In response to a request for start of wireless communication, the wakeup transmitter transmits, to the wireless base station via the antenna, a first wireless frame having a frame length representing identification information of a wireless base station to be transitioned from a sleep mode to an operating mode, or a second wireless frame having an amplitude representing identification information of the wireless base station. Each of the first and second wireless frames is the same wireless frame as that transmitted and received by the wireless module to and from the wireless base station. The sleep mode is a mode in which the wireless base station is not capable of wirelessly communicating with the terminal device. The operating mode is a mode in which the wireless base station wirelessly communicates with the terminal device.

Further, in an embodiment of the present invention, a wireless base station includes an antenna, a main device, a receiving means, a detecting means, an identifying means, and an activating means. The main device regularly transmits a management frame for managing a terminal device, has an operating mode in which it wirelessly communicates with the terminal device, and a sleep mode in which it is not capable of wirelessly communicating with the terminal device, and transitions from the operating mode to the sleep mode when it has not communicated wirelessly with the terminal device in a certain period of time or no terminal device is assigned to the wireless base station. The receiving means receives a wireless frame via the antenna when the main device is in the sleep mode. The detecting means detects a frame length or amplitude of the wireless frame received by the receiving means. The identifying means identifies identification information based on the frame length or amplitude detected by the detecting means. When the identification information identified by the identifying means is identical with identification information of the wireless base station, the activating means generates a driving signal for causing the main device to transition from the sleep mode to the operating mode and outputs it to the main device. In response to the driving signal, the main device transitions from the sleep mode to the operating mode. The wireless frame is the same wireless frame as that transmitted and received by the main device to and from the terminal device.

Furthermore, according to an embodiment of the present invention, a wireless communication system includes a terminal device and a wireless base station. The wireless base station wirelessly communicates with the terminal device. The terminal device includes the terminal device according to the claimed embodiments. The wireless base station includes the wireless base station according to the claimed embodiments.

According to an embodiment of the present invention, the terminal device transmits, to the wireless base station, a wireless frame that has a frame length or amplitude that represents the ID of a wireless base station to be woken up. The wireless base station then detects a wakeup ID from the frame length or amplitude of the wireless frame from the terminal device and, if the detected wakeup ID is identical with its own ID, transitions from the sleep mode to the operating mode. In this case, the wireless frame is the same wireless frame as that transmitted and received by the wireless module of the terminal device to and from the wireless base station.

Thus, a wireless base station may be activated using normal wireless frames.

Further, since the wakeup ID is transmitted from the terminal device to the wireless base station using a normal wireless frame and received by the wireless base station, the wireless base station and terminal device require no special device for transmitting and receiving wakeup IDs, and only one antenna may be needed.

BEST MODES FOR CARRYING OUT THE INVENTION

Figure 1:
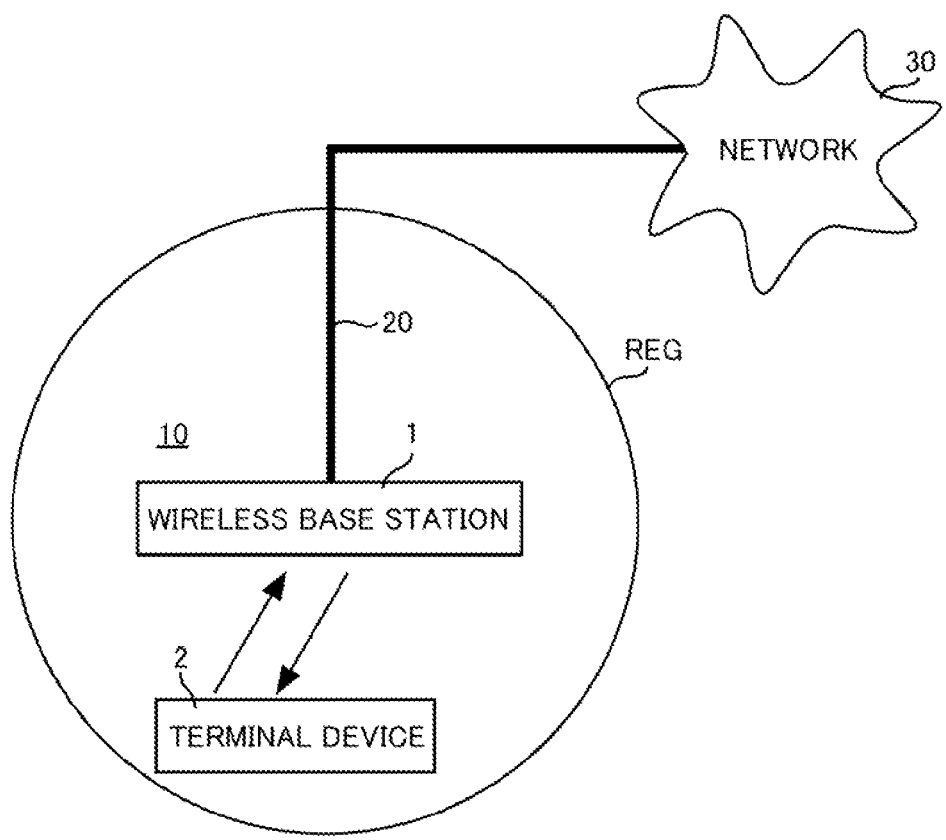
FIG. 1 is a schematic diagram of a wireless communication system according to an embodiment of the present invention.

Embodiments of the present invention will be described in detail with reference to the drawings. The same or corresponding components in the drawings are labeled with the same characters, and their description will not be repeated.

FIG. 1 is a schematic diagram of a wireless communication system according to an embodiment of the present invention. Referring to FIG. 1, a wireless communication system 10 according to an embodiment of the present invention includes a wireless base station 1 and a terminal device 2.

The wireless base station 1 has a communication area REG. The wireless base station 1 is connected to a network 30 via a cable 20.

The wireless base station 1 regularly transmits beacon frames Beacon (i.e. management frames) for managing the terminal device 2, and has an operating mode in which it wirelessly communicates with the terminal device 2 and a sleep mode in which it is not capable of wirelessly communicating (i.e. transmitting and receiving data) with the terminal device 2.

When the wireless base station 1 has not wirelessly communicated with the terminal device 2 in a certain period of time or no terminal device is assigned to it (i.e. no terminal device is present in the communication area REG), the wireless base station 1 transitions from the operating mode to the sleep mode.

When the wireless base station 1 in the sleep mode receives, from the terminal device 2, a wakeup signal for activating itself, it transitions from the sleep mode to the operating mode. Then, the wireless base station 1 wirelessly communicates with the terminal device 2 and communicates with other communication devices via the cable 20 and network 30. In this case, the wireless base station 1 may wirelessly communicate with the terminal device 2 in the 2.45 GHz band, for example.

The terminal device 2 is in the communication area REG of the wireless base station 1. When the terminal device 2 does not receive a beacon frame Beacon from the wireless base station 1, it determines that the wireless base station 1 is in the sleep mode. When the terminal device 2 starts wireless communication with the wireless base station 1 when the wireless base station 1 is in the sleep mode, it generates a wakeup signal for activating the wireless base station 1 and wirelessly transmits the generated wakeup signal to the wireless base station 1 in the 2.45 GHz band. In other words, the terminal device 2 uses the same frequency band as that used by the wireless base station 1 for wireless communication to transmit a wakeup signal to the wireless base station 1.

When the wireless base station 1 is in the operating mode, the terminal device 2 performs normal wireless communication with the wireless base station 1 in the 2.45 GHz band.

Embodiment 1

Figure 2:
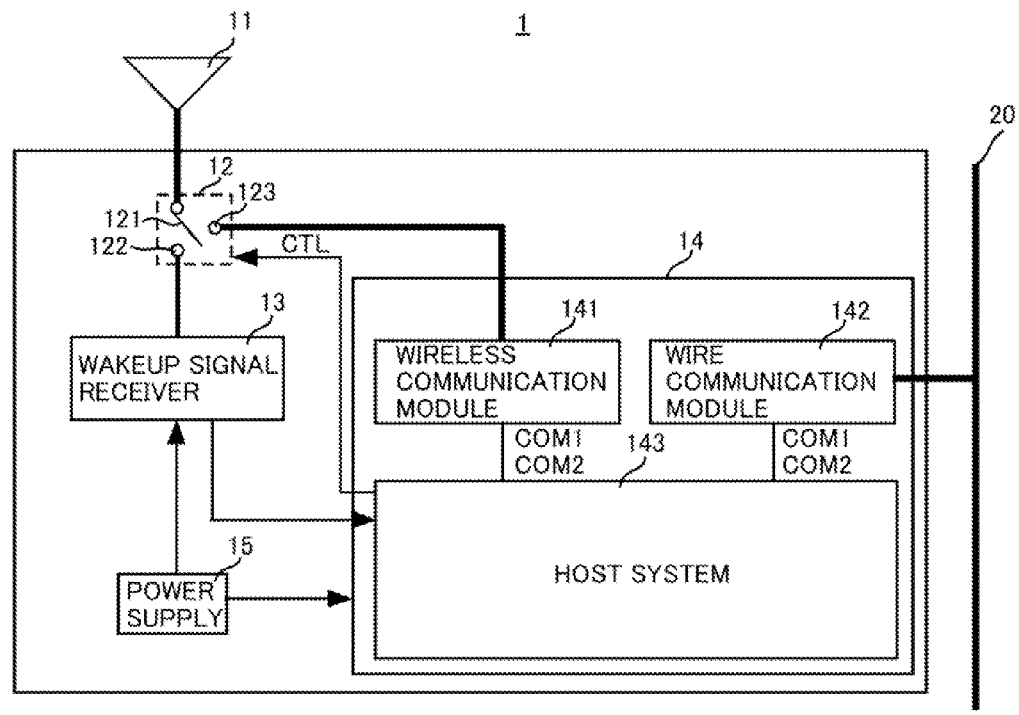
FIG. 2 illustrates a configuration of the wireless base station of FIG. 1 according to Embodiment 1.

FIG. 2 illustrates a configuration of the wireless base station 1 of FIG. 1 according to Embodiment 1. Referring to FIG. 2, the wireless base station 1 includes an antenna 11, switching device 12, wakeup signal receiver 13, main device 14 and power supply 15.

The antenna 11 is connected to the wakeup signal receiver 13 or main device 14 via the switching device 12.

The switching device 12 is connected between the antenna 11 and the wakeup signal receiver 13 and main device 14.

The antenna 11 receives a wireless frame from the terminal device 2 via wireless communication, and outputs the received wireless frame to the wakeup signal receiver 13 or main device 14 via the switching device 12. Further, the antenna 11 transmits a wireless frame received from the main device 14 to the terminal device 2 via wireless communication.

In response to a control signal CTL from the main device 14, the switching device 12 connects the antenna 11 to the wakeup signal receiver 13 or main device 14.

The wakeup signal receiver 13 may receive 100 μW power, for example, from the power supply 15 and be driven by the received power. When the main device 14 is in the sleep mode, the wakeup signal receiver 13 is connected to the antenna 11 via the switching device 12. When the wakeup signal receiver 13 receives a wireless frame from the terminal device 2 via the antenna 11, it detects a wakeup ID represented by the length of the received wireless frame and determines whether the detected wakeup ID is identical with the ID of the wireless base station 1. If the wakeup signal receiver 13 determines that the wakeup ID is identical with the ID of the wireless base station 1, it generates a driving signal and outputs the generated driving signal to the main device 14.

On the other hand, if the wakeup ID is not identical with the ID of the wireless base station 1, the wakeup signal receiver 13 discards the wireless frame. The wakeup signal receiver 13 then waits for receiving another wireless frame.

The wakeup signal receiver 13 only has the function of receiving wireless frames for waking up the wireless base station 1, and does not have the function of transmitting wireless frames.

The main device 14 may receive 7 W power, for example, from the power supply 15 and be driven by the received power.

When the main device 14 is in the operating mode, it wirelessly communicates with the terminal device 2 via the antenna 11 and communicates with other communication devices via the cable 20.

When the main device 14 has not wirelessly communicated with the terminal device 2 in a certain period of time, T1, or when no terminal device is assigned to the wireless base station 1, the main device 14 transitions from the operating mode to the sleep mode. The certain period T1 may be several dozens of seconds, for example.

Further, when the main device 14 in the sleep mode receives a driving signal from the wakeup signal receiver 13, it transitions from the sleep mode to the operating mode.

The power supply 15 supplies 100 µW power to the wakeup signal receiver 13 and supplies 7 W power to the main device 14.

The switching device 12 includes a switch 121 and terminals 122 and 123. The main device 14 includes a wireless communication module 141, wire communication module 142 and host system 143.

The switch 121 is connected to the antenna 11. The terminal 122 is connected to the wakeup signal receiver 13. The terminal 123 is connected to the wireless communication module 141.

The switch 121 receives a control signal CTL from the host system 143 of the main device 14. Then, depending on the control signal CTL, the switch 121 connects the antenna 11 to the terminal 122 or terminal 123.

In this case, the control signal CTL may be composed of an L (logical low) level signal or an H (logical high) level signal. If the control signal CTL is composed of an L level signal, the switch 121 connects the antenna 11 to the terminal 122, and, if the control signal CTL is composed of an H level signal, the switch 121 connects the antenna 11 to the terminal 123.

When the wireless communication module 141 receives a command signal COM1 from the host system 143, it transitions from the operating mode to the sleep mode, and, when it receives a command signal COM2 from the host system 143, it transitions from the sleep mode to the operating mode. The sleep mode is a mode in which the wireless communication module 141 is not operating.

Then, when the wireless communication module 141 transitions to the operating mode, it generates a wireless frame for notifying the terminal device 2 that the wireless base station 1 is operating (operation notification), and transmits the generated wireless frame (i.e. the operation notification) to the terminal device 2.

Thereafter, the wireless communication module 141 regularly transmits beacon frames Beacon via the antenna 11 to establish a wireless communication link with the terminal device 2. Then, the wireless communication module 141 wirelessly communicates with the terminal device 2. In this case, the wireless communication module 141 may retrieve data from a wireless frame received from the terminal device 2 and output the data to the host system 143, and may also generate a wireless frame containing data received from the host system 143 and transmit it to the terminal device 2.

The wire communication module 142 may receive data from other communication devices via the cable 20 and output the received data to the host system 143.

The wire communication module 142 may also receive data from the host system 143 and transmit the received data to other communication devices via the cable 20.

Further, when the wire communication module 142 receives a command signal COM1 from the host system 143, it transitions from the operating mode to the sleep mode, and, when it receives a command signal COM2 from the host system 143, it transitions from the sleep mode to the operating mode. The sleep mode is a mode in which the wire communication module 142 is not operating.

When the host system 143 has not received a wireless frame from the terminal device 2 via the wireless communication module 141 in a certain period T1, or when no terminal device is in the communication area REG, the host system generates a command signal COM1 and outputs the generated command signal COM1 to the wireless communication module 141 and wire communication module 142, and generates a control signal CTL with the L level to output it to the switching device 12. Then, the host system 143 transitions to the sleep mode (i.e. non-operating mode).

When the host system 143 receives a driving signal from the wakeup signal receiver 13, it transitions from the sleep mode to the operating mode. The host system 143 then generates a command signal COM2 and outputs the generated command signal COM2 to the wireless communication module 141 and wire communication module 142, and generates a control signal CTL with the H level to output it to the switch device 12.

Further, when the host system 143 receives data from the wire communication module 141, it outputs the received data to the wire communication module 142.

Further, when the host system 143 receives data from the wire communication module 142, it outputs the received data to the wireless communication module 141.

Further, the host system 143 administers one or more terminal devices which is in the communication area REG.

Figure 3:
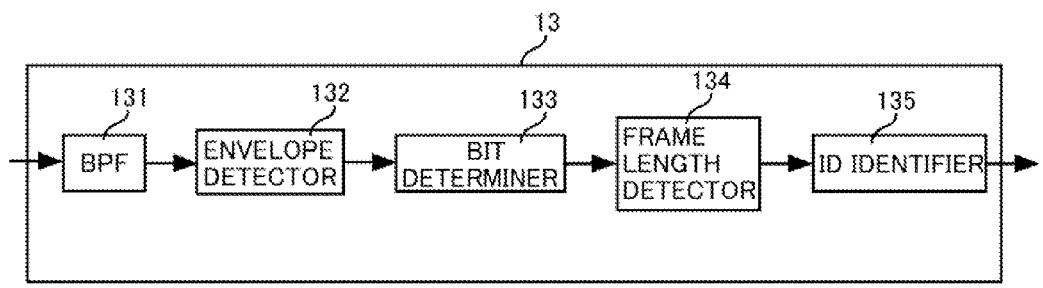
FIG. 3 illustrates a configuration of the wakeup signal receiver of FIG. 2.

FIG. 3 illustrates a configuration of the wakeup signal receiver 13 of FIG. 2. Referring to FIG. 3, the wakeup signal receiver 13 includes a BPF (band pass filter) 131, an envelope detector 132, a bit determiner 133, a frame length detector 134 and an ID identifier 135.

The BPF 131 receives radio waves via the antenna 11 and switching device 12, and extracts from the received radio waves a signal having the frequency of wireless frames. The BPF 131 then outputs the extracted signal to the envelope detector 132.

The envelope detector 132 detects an envelope of a wireless frame received from the BPF 131 at a certain interval (for example, 10 µs) and outputs the detected signal to the bit determiner 133.

The bit determiner 133 converts the detected signal received from the envelope detector 132 to a bit value of "0" or "1", and outputs the resulting bit sequence to the frame length detector 134.

The frame length detector 134 detects the frame length of the wireless frame based on the bit sequence received from the bit determiner 133. More specifically, the frame length detector 134 counts the cumulative number of bits of the value "1" and, when a bit with the value "0" is input, outputs the cumulative value to the ID identifier 135, and resets the cumulative value.

The ID identifier 135 receives the cumulative value from the frame length detector 134 and converts the received cumulative value to a bit sequence in a manner discussed below. The ID identifier 135 then holds the converted bit sequence.

Then, if the held bit sequence is identical with the identification information (ID) of the wireless base station 1, the ID identifier 135 generates a driving signal and outputs it to the host system 143.

If the bit length of the held bit sequence exceeds the length of a wakeup ID, the ID identifier 135 discards the oldest bit value in the bit sequence, one after another.

Figures 4, 5:
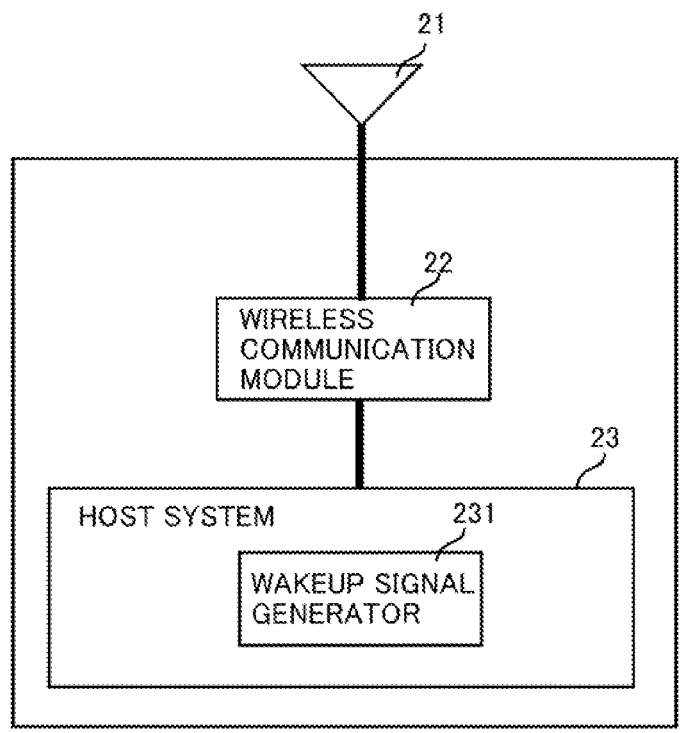
FIG. 4 illustrates a configuration of the terminal device of FIG. 1 according to Embodiment 1.
FIG. 5 illustrates a conversion table of bit sequences and frame lengths L which are time lengths of wireless frames.

FIG. 4 illustrates a configuration of the terminal device 2 of FIG. 1 according to Embodiment 1. Referring to FIG. 4, the terminal device 2 includes an antenna 21, a wireless communication module 22 and a host system 23. The host system 23 includes a wakeup signal generator 231.

When the wireless communication module 22 receives an operation notification from the wireless base station 1 via the antenna 21, it establishes a wireless communication link with the wireless base station 1, and wirelessly communicates with the wireless base station 1.

In this case, the wireless communication module 22 may receive a wireless frame from the wireless base station 1 via the antenna 21, demodulate the received wireless frame to retrieve data, and output the retrieved data to the host system 23. The wireless communication module 22 may also receive data from the host system 23 and generate a wireless frame containing the received data, modulate the generated wireless frame by means of a modulation technique for a wireless LAN, and transmit the modulated wireless frame to the wireless base station 1 via the antenna 21.

The wireless communication module 22 transmits a payload received from the wakeup signal generator 231 of the host system 23 to the wireless base station 1 at a transmission rate received from the wakeup signal generator 231 via the antenna 21.

The host system 23 receives from the wireless communication module 22 a beacon frame Beacon that has been received by the wireless communication module 22 via the antenna 21. The host system 23 then retrieves an ESSID or BSSID contained in the received beacon frame Beacon and administers it, and administers the wireless base station 1 to which the terminal device 2 is assigned based on the ESSID or BSSID.

When the host system 23 receives no beacon frame Beacon from the wireless base station 1, it determines that the wireless base station 1 is in the sleep mode, and outputs a command signal COM3 and ESSID (or BSSID) to the wakeup signal generator 231.

Further, the host system 23 may receive data from the wireless communication module 22 and generate data to output it to the wireless communication module 22.

When the wakeup signal generator 231 receives, from the host system 23, a command signal COM3 and ESSID (or BSSID), it generates a wakeup ID composed of any one of an ESSID, a BSSID, a hash thereof, and provides the wireless communication module 22 with the generated wakeup ID and a transmission rate for transmitting a wireless frame where the time length of the transmitted wireless frame constitutes a wakeup ID. The wakeup ID is information identifying a wireless base station to be activated by the terminal device 2.

FIG. 5 illustrates a conversion table of bit sequences and frame lengths L which are time lengths of wireless frames.

Referring to FIG. 5, the conversion table TBL1 contains bit sequences and frame lengths. The bit sequences and frame lengths are in corresponding relationship with each other.

The frame length L of 230 µs corresponds to the bit sequence "000000"; the frame length L of 260 (µs) corresponds to the bit sequence "000001"; the frame length L of 290 (µs) corresponds to the bit sequence "000010"; and so forth. Then, the frame length L of 2120 (µs) corresponds to the bit sequence "111110" and the frame length L of 2150 (µs) corresponds to the bit sequence "111111". The bit sequences such as "000000" are wakeup IDs. In other words, the bit sequences such as "000000" are identification information for the wireless base station 1 to be woken up.

The wakeup signal generator 231 holds the conversion table TBL1. The wakeup signal generator 231 looks at the conversion table TBL1 to allocate the frame length L=230 (µs) to the wakeup ID "000000".

Then, the wakeup signal generator 231 determines such a payload size that the frame length is closest to L=230 (µs), generates a payload having the determined payload size, and outputs the generated payload to the wireless communication module 22. The wireless communication module 22 receives the payload from the wakeup signal generator 231, generates a wireless frame containing the received payload, and transmits the generated wireless frame to the wireless base station 1.

Further, if the wakeup signal generator 231 allocates the frame length L=230 (µs) to the wakeup ID "000000", it determines such a transmission rate for transmission that the time length of a wireless frame containing the wakeup ID "000000" is 230 (µs), and provides the wireless communication module 22 with the determined transmission rate and the wakeup ID "000000". The wireless communication module 22 receives the wakeup ID "000000" and the transmission rate from the wakeup signal generator 231. The wireless communication module 22 then generates a wireless frame containing the wakeup ID "000000" and transmits the generated wireless frame to the wireless base station 1 at the transmission rate received from the wakeup signal generator 231.

Furthermore, if the wakeup signal generator 231 allocates the frame length L=230 (µs) to the wakeup ID "000000", it determines such a payload size that the frame length is closest to L=230 (µs) and generates a payload having the determined payload size. Also, the wakeup signal generator 231 determines such a transmission rate for transmission that the time length of a wireless frame containing the generated payload is 230 (µs). The wakeup signal generator 231 then outputs the generated payload and the determined transmission rate to the wireless communication module 22.

The wireless communication module 22 receives the payload and transmission rate from the wakeup signal generator 231 and generates a wireless frame containing the received payload. The wireless communication module 22 then transmits the generated wireless frame to the wireless base station 1 at the transmission rate received from the wakeup signal generator 231.

Thus, the wireless communication module 22 controls at least one of payload size and transmission rate such that the frame length is L=230 (µs), and uses at least one of controlled payload size and transmission rate to transmit a wireless frame to the wireless base station 1. As such, it is possible to allow the terminal device 2 to wake up the wireless base station 1 without modifying the wireless communication module 22 and only by adding the wakeup signal generator 231.

The content of data, which makes up the payload, may be random values or specified values.

For the wakeup IDs such as "000001", the wakeup signal generator 231 outputs a payload and/or transmission rate to the wireless communication module 22 in a similar manner.

In the conversion table TBL1, one frame length L differs from another by 30 μs such that the clock frequency of the wakeup signal receiver 13 of the wireless base station 1 may be reduced and the wakeup signal receiver 13 may recognize the border between adjacent wireless frames.

As discussed above, in Embodiment 1, the terminal device 2 transmits to the wireless base station 1 a wireless frame having a frame length representing the wakeup ID.

In this case, the wireless frame is composed of a management frame such as Probe Request, or a data frame to be broadcast, or data frame to be transmitted to a wireless base station other than the wireless base station 1 to be woken up or a terminal device other than the terminal device 2.

If the wireless frame is composed of a data frame, the wakeup signal generator 231 adjusts the transmission rate and fragmentation for the data frame, and transmits the wireless frame having the frame length L corresponding to the wakeup ID to the wireless base station 1 via the wireless communication module 22 and antenna 21.

The case where a wakeup ID is transmitted using a data frame to be transmitted to a wireless base station other than the wireless base station 1 to be woken up is suitable when the terminal device 2 undergoes handover.

Figure 6:
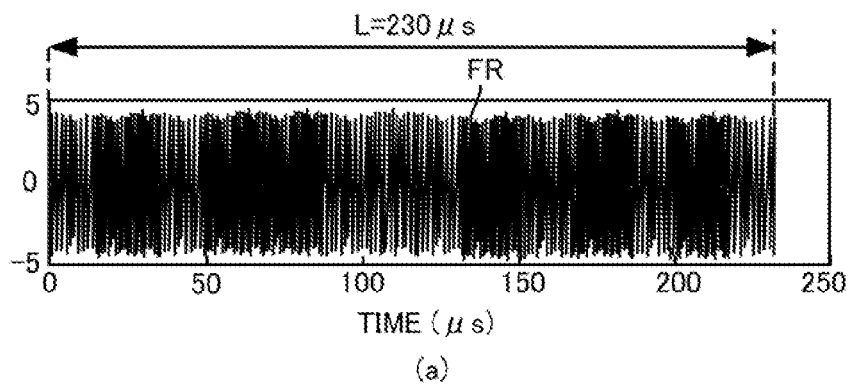
FIG. 6 illustrates concepts of envelope detection and bit determination.

FIG. 6 illustrates concepts of envelope detection and bit determination. Referring to FIG. 6, the envelope detector 132 of the wakeup signal receiver 13 receives a wireless frame FR from the BPF 131. The wireless frame FR has a frame length L of 230 (μs), for example (see (a)).

The envelope detector 132 detects an envelope EVL of the wireless frame FR, and detects the envelope EVL at an interval of 10 (μs), to obtain the detected values $I_1$ to $I_{24}$ (see (b)).

Then, the envelope detector 132 outputs the detected values $I_1$ to $I_{24}$ to the bit determiner 133. The bit determiner 133 determines the bits of the detected values $I_1$ to $I_{24}$ and obtains the bit sequence "111 . . . 1110". The bit determiner 133 then outputs the bit sequence "111 . . . 1110" to the frame length detector 134.

The frame length detector 134 accumulates bits of the value "1" starting from the beginning of the bit sequence "111 . . . 1110" and obtains the cumulative value of "23". Since the value of the 24th bit is "0", the frame length detector 134 outputs the cumulative value of "23" to the ID identifier 135 and resets the cumulative value.

Figure 7:
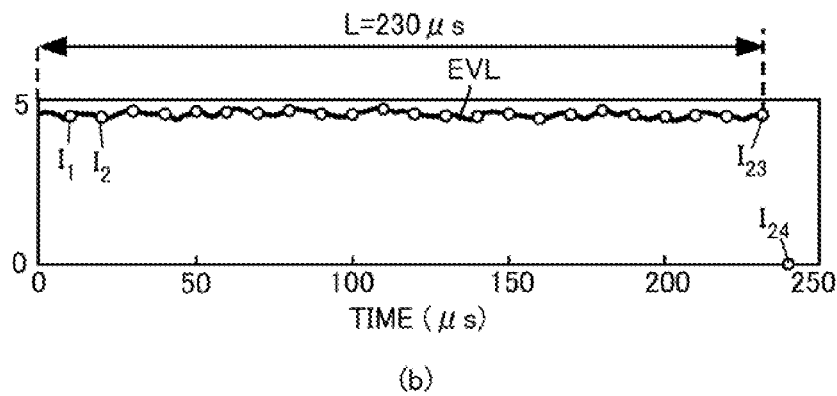
FIG. 7 illustrates a conversion table of cumulative values and bit sequences.

FIG. 7 illustrates a conversion table of cumulative values and bit sequences. Referring to FIG. 7, the conversion table TBL2 contains cumulative values and bit sequences. The cumulative values and bit sequences are in corresponding relationship with each other.

The bit sequence "000000" corresponds to the cumulative value c of $22 \leq c \leq 24$; the bit sequence "000001" corresponds to the cumulative value c of $25 \leq c \leq 27$; the bit sequence "000010" corresponds to the cumulative value c of $28 \leq c \leq 30$, and so forth. Then, the bit sequence "111110" corresponds to the cumulative value c of $211 \leq c \leq 213$, and the bit sequence "111111" corresponds to the cumulative value of $214 \leq c \leq 216$.

The ID identifier 135 holds the conversion table TBL2. When the ID identifier 135 receives the cumulative value c of 23 from the frame length detector 134, it looks at the conversion table TBL2 to detect the bit sequence "000000".

Then, if the detected bit sequence "000000" is identical with the identification information (ID) of the wireless base station 1, the ID identifier 135 generates a driving signal and outputs it to the main device 14.

Figure 8:
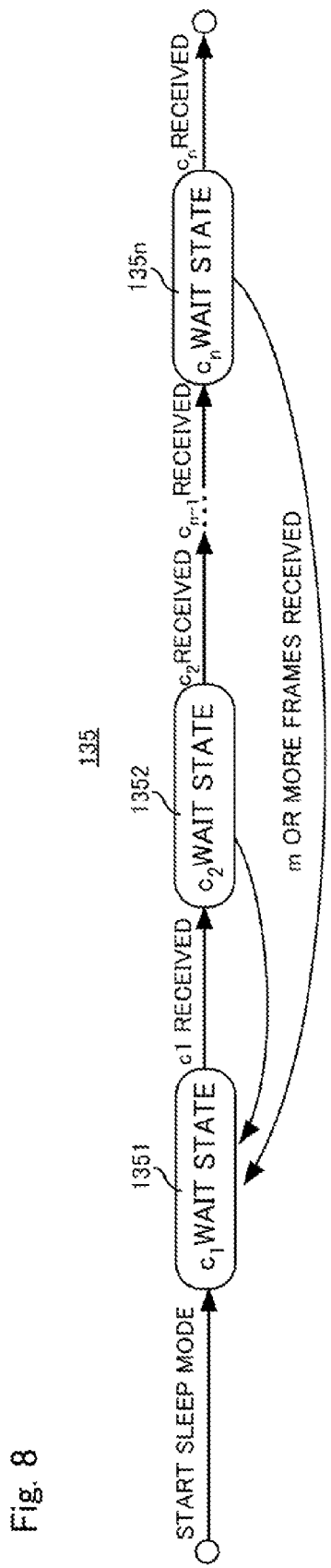
FIG. 8 is a state transition diagram for the ID identifier of FIG. 3 in the case where a wakeup signal includes a plurality of wakeup frames.

FIG. 8 is a state transition diagram for the ID identifier 135 of FIG. 3 in the case where a wakeup signal is composed of a plurality of wireless frames.

The terminal device 2 may use a plurality of wireless frames to transmit a wakeup signal to the wireless base station 1. In such case, the wakeup signal receiver 13 cannot decode the wakeup signal correctly if a wireless frame transmitted by a terminal device other than the terminal device 2 comes between wireless frames transmitted by the terminal device 2.

In view of this, the ID identifier 135 may be constructed as shown in FIG. 8. More specifically, the ID identifier 135 has a $c_1$ wait state 1351, a $c_2$ wait state 1352, . . . , $c_n$ wait state 135n (n is an integer not less than 2).

The $c_1$ wait state 1351 to $c_n$ wait state 135n are states waiting for the cumulative values $c_1, c_2, \ldots, c_n$ respectively.

When the wireless base station 1 transitions to the sleep mode, the ID identifier 135 is first in the $c_1$ wait state 1351; when the cumulative value $c_1$ or a cumulative value near c1, such as $c_1-1$ and $c_1+1$, is input, the ID identifier 135 transitions to the $c_2$ wait state 1352; then, when the cumulative value $c_2$ or a cumulative value near $c_2$ is input, the ID identifier 135 transitions to the $c_3$ wait state 1353; and so forth. Then, when the cumulative value $c_n-1$ or a cumulative value near $c_n-1$ is input, the ID identifier 135 transitions to the $c_n$ wait state 135n; when the cumulative value $c_n$ or a cumulative value near $c_n$ is input, the ID identifier 135 determines that the value is identical with the identification information (ID), and generates a driving signal and outputs it to the main device 14. As a result, the wireless base station 1 transitions to the operating mode.

Thus, if a wakeup signal is transmitted using a plurality of wireless frames, the ID identifier 135 detects n cumulative values $c_1, c_2, \ldots, c_n$ to detect the wakeup ID.

On the other hand, if at the $c_2$ wait state 1352, for example, the cumulative value $c_2$ or a cumulative value near $c_2$ has not been input in a certain period of time, or if a cumulative value different from the cumulative value $c_2$ or a cumulative value near $c_2$ is input m or more times (m is an integer not less than 2), the ID identifier 135 returns to the $c_1$ wait state 1351 which is the initial state. In other words, even if a wireless frame that is not a wakeup signal happens to be identical with a cumulative value that is being waited for, the ID identifier 135 returns to $c_1$ wait state 1351 which is the initial state, when n cumulative values $c_1, c_2, \ldots, c_n$ are not input sequentially.

It is supposed that, while the terminal device 2 is transmitting a wakeup signal, a wireless frame of another terminal device interrupts the transmission; even when, at the $c_2$ wait state 1352, for example, a cumulative value different from the cumulative value $c_2$ or a cumulative value near $c_2$ is input, the ID identifier 135 transitions to the state where it waits for the next cumulative value $c_3$ if the cumulative value of $c_2$ is input within a certain period or before a different cumulative value is input m or more times.

Thus, as the ID identifier 135 transitions among the states shown in FIG. 8, a wakeup signal may be received correctly and the main device 14 may be driven even if a wakeup signal is transmitted using a plurality of wireless frames.

Figure 9:
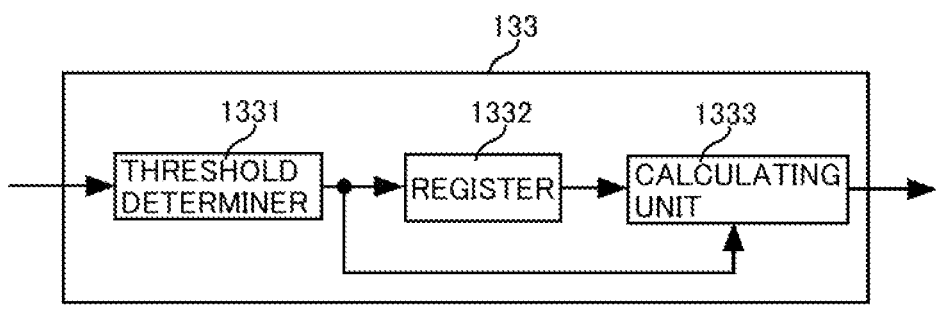
FIG. 9 illustrates a specific configuration of the bit determiner of FIG. 3.

FIG. 9 illustrates a specific configuration of the bit determiner 133 of FIG. 3. Referring to FIG. 9, the bit determiner 133 includes a threshold determiner 1331, a register 1332 and a calculating unit 1333.

The threshold determiner 1331 holds a threshold RSSI_th1 of −90 dBm, for example, in advance. The threshold determiner 1331 compares the detected values $I_1$ to $I_{24}$ received from the envelope detector 132 with the threshold RSSI_th1 to determine the bit of the detected values $I_1$ to $I_{24}$. More specifically, if one of the detected values $I_1$ to $I_{24}$ is equal to or larger than the threshold RSSI_th1, the threshold determiner 1331 converts each of the detected values $I_1$ to $I_{24}$ to "1"; if one of the detected values $I_1$ to $I_{24}$ is smaller than the threshold RSSI_th1, the threshold determiner 1331 converts each of the detected values $I_1$ to $I_{24}$ to "0".

Then, the threshold determiner 1331 outputs the bit sequence composed of the converted bit values to the register 1332 and the calculating unit 1333.

The register 1332 holds the bit sequence received from the threshold determiner 1331 while shifting it, one bit at one interval, and outputs the held bit sequence to the calculating unit 1333 sequentially.

The calculating unit 1333 receives sequentially each bit value of a bit sequence from the threshold determiner 1331 and receives sequentially the each bit value which is delayed by one interval from the register 1332. The calculating unit 1333 then calculates a logical sum (OR) of the received two bit values and outputs the calculated result to the frame length detector 134.

The space between wireless frames under IEEE 802.11b is 30 μs or larger. The envelope detector 132 detects an envelope at an interval of 10 μs and the bit determiner 133 determines a bit at an interval of 10 μs. As such, two or more "0" bits are always present between wireless frames. Thus, if the result of a bit determination is "101", the "0" bit is likely to be an error.

However, since the bit determiner 133 is constructed as shown in FIG. 9, the bit sequence "101" is corrected to "111". Thus, a bit determiner 133 of the construction shown in FIG. 9 reduces bit errors in bit determination.

Since such bit errors occur in a fading environment, a bit determiner 133 of the construction shown in FIG. 9 reduces bit errors generated by fading in bit determination.

Figure 10:
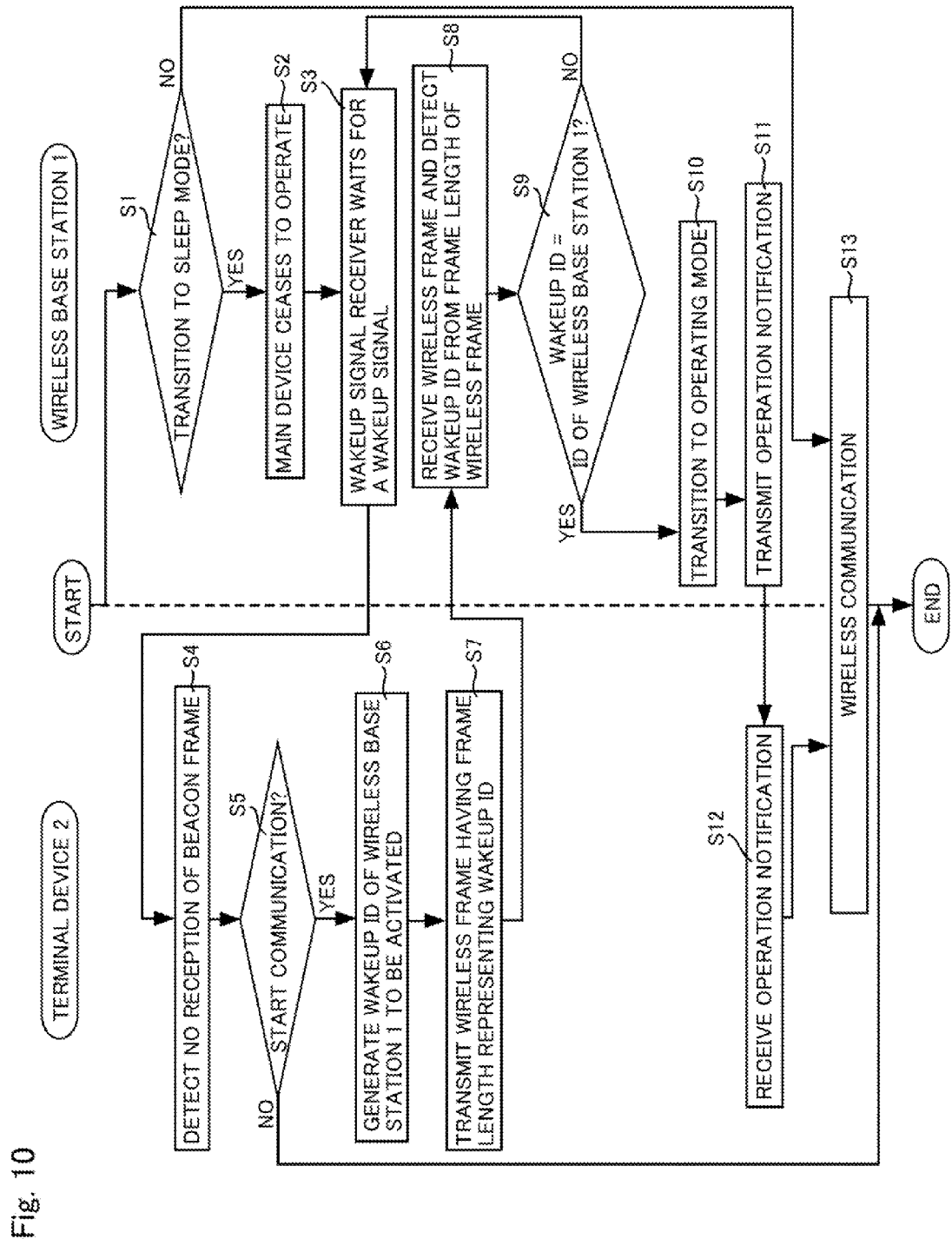
FIG. 10 is a flow chart illustrating how the wireless communication system of FIG. 1 is operated according to Embodiment 1.

FIG. 10 is a flow chart illustrating how the wireless communication system 10 of FIG. 1 is operated according to Embodiment 1.

Referring to FIG. 10, upon initiation of the process, the host system 143 of the wireless base station 1 determines whether a transition should be made to the sleep mode (step S1). More specifically, the host system 143 of the wireless base station 1 determines that a transition should be made to the sleep mode if it has not wirelessly communicated with the terminal device 2 in a certain period T1 or no terminal device is assigned to the wireless base station 1, or if it is thus determined by some other determination algorithm such as scheduling. The host system 143 of the wireless base station 1 determines that a transition should not be made to the sleep mode if it has wirelessly communicated with the terminal device 2 within the certain period T1 or a terminal device is assigned to the wireless base station 1.

If it is determined at step S1 that a transition should be made to the sleep mode, the host system 143 of the wireless base station 1 generates a command signal COM1 and outputs it to the wireless communication module 141 and wire communication module 142, and generates a control signal CTL with an L level signal and outputs it to the switching device 12, and then ceases to operate. In response to the control signal CTL with the L level, the switching device 12 of the wireless base station 1 connects the antenna 11 to the terminal 122. In response to the command signal COM1, the wireless communication module 141 and wire communication module 142 of the wireless base station 1 cease to operate. In other words, if it is determined at step S1 that a transition should be made to the sleep mode, the main device 14 ceases to operate (step S2).

Then, the wakeup signal receiver 13 waits for a wakeup signal (step S3).

Thereafter, the host system 23 of the terminal device 2 detects that it is not receiving a beacon frame Beacon from the wireless base station 1 (step S4). In other words, the host system 23 of the terminal device 2 detects that the wireless base station 1 is in the sleep mode. Then, the host system 23 of the terminal device 2 determines whether wireless communication should be started (step S5).

If it is determined at step S5 that wireless communication should be started, the host system 23 of the terminal device 2 outputs the ESSID (or BSSID) of the wireless base station 1 to be activated and a command signal COM3 to the wakeup signal generator 231. When the wakeup signal generator 231 of the terminal device 2 receives the command signal COM3, it generates a wakeup ID in the manner described above based on the ESSID (or BSSID). In other words, the terminal device 2 generates a wakeup ID identifying the wireless base station 1 to be activated (step S6).

Then, the wakeup signal generator 231 of the terminal device 2 calculates a payload size and transmission rate required to represent the generated wakeup ID by a wireless frame length, generates a payload having the calculated payload size, and outputs the generated payload and calculated transmission rate to the wireless communication module 22.

The wireless communication module 22 of the terminal device 2 converts the payload received from the wakeup signal generator 231 to a wireless frame with the transmission rate received from the wakeup signal generator 231, and transmits the converted wireless frame to the wireless base station 1 via the antenna 21 (step S7). More specifically, the wakeup signal generator 231 of the terminal device 2 determines at least one of payload size and transmission rate such that the frame length represents the wakeup ID, and transmits the wireless frame to the wireless base station 1 using the at least one of the determined payload size and transmission rate.

Then, the wakeup signal receiver 13 of the wireless base station 1 receives the wireless frame via the antenna 11 and detects the wakeup ID from the frame length of the received wireless frame in the manner discussed above (step S8).

Then, the wakeup signal receiver 13 of the wireless base station 1 determines whether the detected wakeup ID is identical with the ID of the wireless base station 1 (step S9).

If it is determined at step S9 that the wakeup ID is not identical with the ID of the wireless base station 1, the process returns to step S3.

On the other hand, if it is determined at step S9 that the wakeup ID is identical with the ID of the wireless base station 1, the wakeup signal receiver 13 of the wireless base station 1 generates a driving signal and outputs it to the host system 143. In response to the driving signal from the wakeup signal receiver 13, the host system 143 of the wireless base station 1 transitions from the sleep mode to the operating mode, and generates a command signal COM2 and outputs it to the wireless communication module 141 and wire communication module 142. Then, in response to the command COM2, the wireless communication module 141 and wire communication module 142 of the wireless base station 1 transition from the sleep mode to the operating mode. Thus, in response to a driving signal from the wakeup signal receiver 13, the main device 14 of the base station 1 transitions from the sleep mode to the operating mode (step S10).

Then, the wireless communication module 141 of the wireless base station 1 generates an operation notification, and transmits the generated operating notification to the terminal device 2 via the antenna 11 (step S11).

Then, the wireless communication module 22 of the wireless device 2 receives the operation notification via the antenna 21 (step S12), and outputs the received operation notification to the host system 23. Thereafter, in response to the operation notification from the wireless communication module 22, the host system 23 of the terminal device 2 detects that the wireless base station 1 has transitioned from the sleep mode to the operating mode.

Then, the wireless communication module 141 of the wireless base station 1 starts wireless communication to establish a wireless communication link with the terminal device 2, and establishes a wireless communication link with the terminal device 2 to perform wireless communication (step S13).

If it is determined at step S1 that a transition should not be made to the sleep mode, the process proceeds to step S13.

After step S13, or if it is determined at step S5 that wireless communication should not be started, the process ends.

In the case where a wakeup ID is represented by a plurality of frame lengths of a plurality of wireless frames, at step S8, the wakeup signal receiver 13 of the wireless base station 1 detects the wakeup ID in the manner discussed with reference to FIG. 8.

In the case where the wireless communication environment is a fading environment, at step S8, the wakeup signal receiver 13 of the wireless base station 1 determines bits in the manner discussed with reference to FIG. 8 to detect the wakeup ID.

As discussed above, in Embodiment 1, the terminal device 2 transmits a wireless frame having a frame length representing the ID of a wireless base station 1 to be woken up to the wireless base station 1. The wireless base station 1 then detects the wakeup ID from the frame length of the wireless frame from the terminal device 2 and, if the detected wakeup ID is identical with its own ID, transitions from the sleep mode to the operating mode. In this case, the wireless frame is one under IEEE 802.11.

Thus, the wireless base station 1 may be activated using a wireless frame under IEEE 802.11.

Further, since the wakeup ID is transmitted from the terminal device 2 to the wireless base station 1 using a normal wireless frame and received by the wireless base station 1, the wireless base station 1 and terminal device 2 requires no special device for transmitting and receiving a wakeup ID, and only one antenna may be needed.

Embodiment 2

Figure 11:
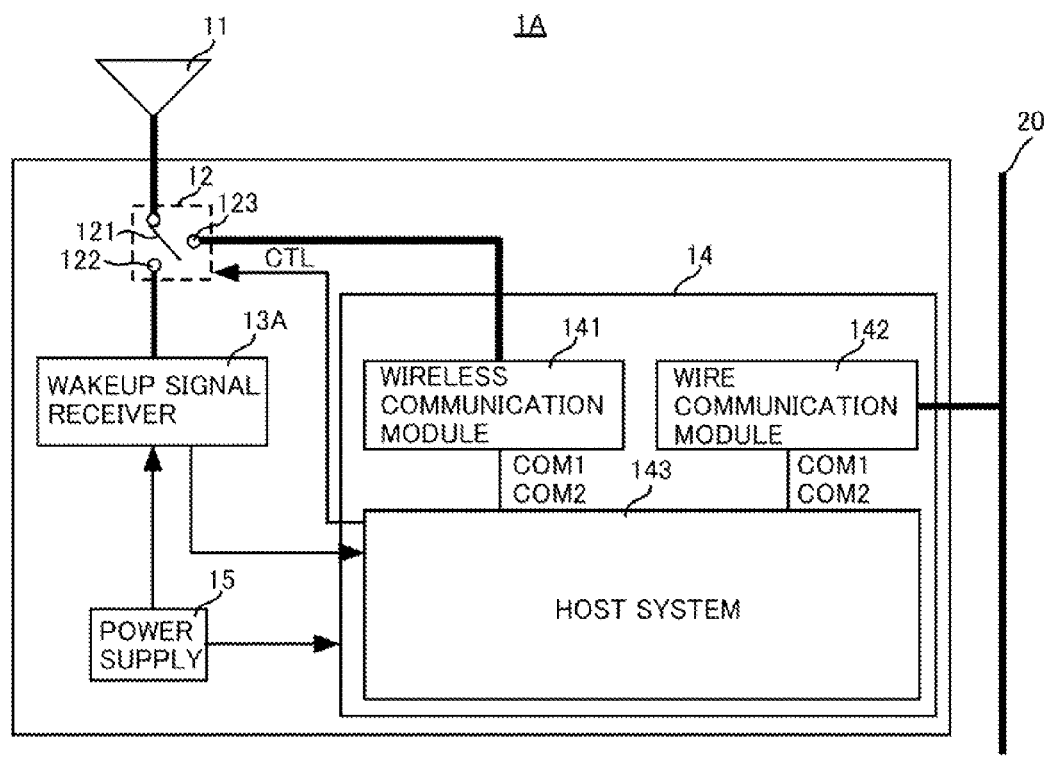
FIG. 11 illustrates a configuration of the wireless base station of FIG. 1 according to Embodiment 2.

FIG. 11 illustrates a configuration of the wireless base station 1 of FIG. 1 according to Embodiment 2. In Embodiment 2, the wireless base station 1 of FIG. 1 includes a wireless base station 1A shown in FIG. 11.

Referring to FIG. 11, the wireless base station 1A is the same as the wireless base station 1 except that the wakeup signal receiver 13 of the wireless base station 1 of FIG. 2 is replaced by a wakeup signal receiver 13A.

The wakeup signal receiver 13A receives radio waves via the antenna 11 and detects the wakeup ID based on the amplitude of the received radio waves. If the detected wakeup ID is identical with the identification information (ID) of the wireless base station 1A, the wakeup signal receiver 13A generates a driving signal and outputs it to the main device 14.

On the other hand, if the detected wakeup ID is not identical with the identification information (ID) of the wireless base station 1A, the wakeup signal receiver 13A discards the wakeup ID.

Figure 12:
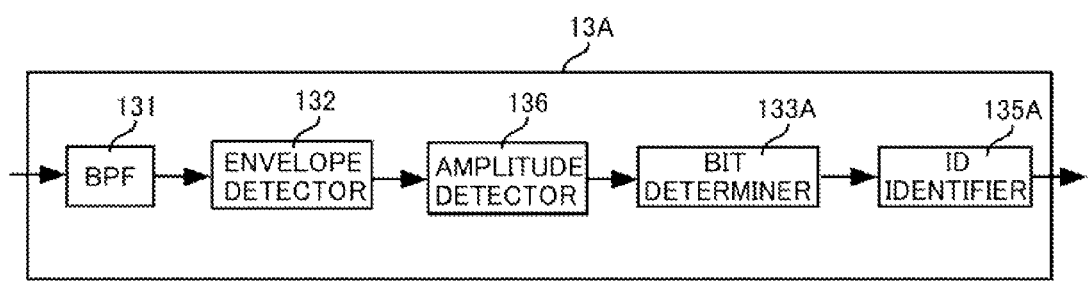
FIG. 12 illustrates a configuration of the wakeup signal receiver of FIG. 11.

FIG. 12 illustrates a configuration of the wakeup signal receiver 13A of FIG. 11. Referring to FIG. 12, the wakeup signal receiver 13A is the same as the wakeup signal receiver 13 except that the bit determiner 133 of the wakeup signal receiver 13 of FIG. 3 is replaced by a bit determiner 133A, the frame length detector 134 is replaced by a amplitude detector 136 and the ID identifier 135 is replaced by a ID identifier 135A.

In the wakeup signal receiver 13A, the amplitude detector 136 is disposed between the envelope detector 132 and the bit determiner 133A, and the bit determiner 133A outputs the result of a bit determination to the ID identifier 135A.

The amplitude detector 136 holds a threshold RSSI_th2 of −80 dBm, for example, in advance. The amplitude detector 136 receives the detected value $I_n$ from the envelope detector 132 at a certain interval (=10 μs). Then, when a detected value $I_n$ not more than the threshold RSSI_th2 is input, the amplitude detector 136 determines that the reception of one wireless frame has been completed, and detects the amplitude $IP_n$ by calculating a mean square of the detected values $I_1$ to $I_n$ that have been input until a detected value $I_{n+1}$ that is not more than the threshold RSSI_th2 is input.

The bit determiner 133A holds a threshold RSSI_th3 in advance. The threshold RSSI_th3 may be 10 dB, for example.

The bit determiner 133A receives the amplitude $IP_n$ from the amplitude detector 136. The bit determiner 133A then calculates the absolute value $\Delta IP_n$ of the difference between the amplitude $IP_{n-1}$ and amplitude $IP_n$, and, if the calculated absolute value $\Delta IP_n$ is not more than the threshold RSSI_th3, outputs "0" to the ID identifier 135A, and, if the absolute value $\Delta IP_n$ is larger than the threshold RSSI_th3, outputs "1" to the ID identifier 135A.

The ID identifier 135A holds the bit sequence received from the bit determiner 133A as a series of bits in an early-to-late order of input and, if the held bit sequence is identical with the identification information (ID) of the wireless base station 1A, generates a driving signal to output to the main device 14. On the other hand, if the bit number of the held bit sequence exceeds the bit number of the wakeup ID, the ID identifier 135A discards the oldest bit, one after another.

Figure 13:
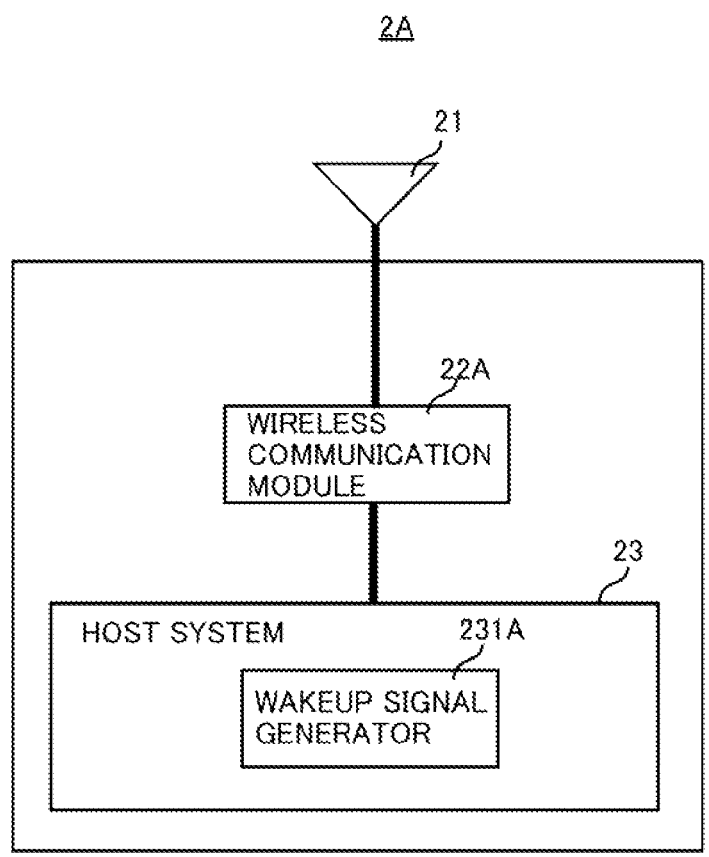
FIG. 13 illustrates a configuration of the terminal device of FIG. 1 according to Embodiment 2.

FIG. 13 illustrates a configuration of the terminal device 2 of FIG. 1 according to Embodiment 2. In Embodiment 2, the terminal device 2 of FIG. 1 includes a terminal device 2A shown in FIG. 13.

Referring to FIG. 13, the terminal device 2A is the same as the terminal device 2 except that the wireless communication module 22 of the terminal device 2 of FIG. 4 is replaced by the wireless communication module 22A and the wakeup signal generator 231 is replaced by the wakeup signal generator 231A.

The wakeup signal generator 231A generates a payload with a fixed length and sets such a transmission power that wireless frames represent a wakeup ID. The wakeup signal generator 231A then outputs the generated payload and information related to the set transmission power to the wireless communication module 22A.

The wireless communication module 22A generates a wireless frame containing the payload received from the wakeup signal generator 231A and transmits the generated wireless frame to the wireless base station 1A with the transmission power received from the wakeup signal generator 231A via the antenna 21.

Figure 14:
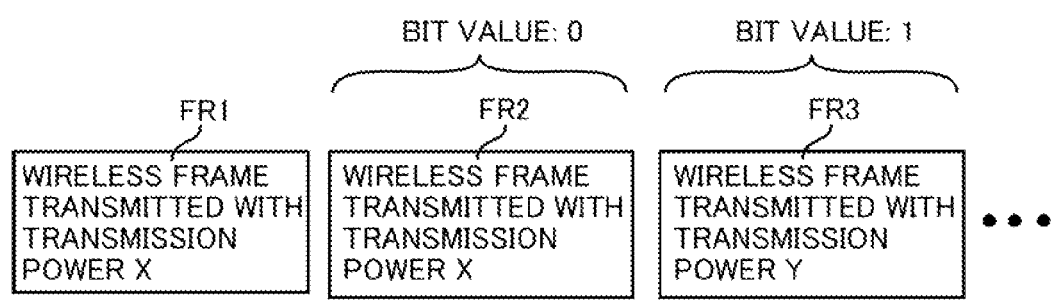
FIG. 14 illustrates concepts of a method of transmitting a wakeup ID at the wakeup signal generator and wireless communication module of FIG. 13.

FIG. 14 illustrates concepts of a method of transmitting a wakeup ID at the wakeup signal generator 231A and wireless communication module 22A of FIG. 13.

Referring to FIG. 14, the wakeup signal generator 231A first generates a payload with a fixed length, sets a transmission power X for the generated payload to output to the wireless communication module 22A. The wireless communication module 22A generates a wireless frame FR1 containing the payload received from the wakeup signal generator 231A and transmits the generated wireless frame FR1 via the antenna 21 with the transmission power X. Thereafter, if the value of the first bit of the wakeup ID is "0", the wakeup signal generator 231A sets again the transmission power X for a newly generated payload to output to the wireless transmission module 22A. The wireless communication module 22A then generates a wireless frame FR2 containing the payload received from the wakeup signal generator 231A and transmits the generated wireless frame FR2 with the transmission power X via the antenna 21. On the other hand, if the value of the first bit of the wakeup ID is "1", the wakeup signal generator 231A sets a transmission power Y, which is different from the transmission power X, for a newly generated payload to output to the wireless communication module 22A. The wireless communication module 22A then generates a wireless frame FR3 containing the payload received from the wakeup signal generator 231A and transmits the generated wireless frame FR3 with the transmission power Y via the antenna 21.

Then, the wakeup signal generator 231A outputs the same transmission power as that previously set, together with the newly generated payload, to the wireless communication module 22A if the bit value is "0". If the bit value is "1", the wakeup signal generator 231A outputs a transmission power different from that previously set, together with the newly generated payload, to the wireless communication module 22A. The wireless communication module 22A then generates a wireless frame containing the payload received from the wakeup signal generator 231A and transmits the generated wireless frame with the transmission power received from the wakeup signal generator 231A.

Thus, the wakeup signal generator 231A allocates each bit of the wakeup ID to a transmission power and transmits a wireless frame having an amplitude representing a wakeup ID via the wireless communication module 22A.

As discussed above, the bit determiner 133A outputs "0" to the ID identifier 135A if the absolute value $\Delta IP_n$ of the difference between the amplitude $IP_{n-1}$ and the amplitude $IP_n$ is not more than the threshold RSSI_th3, and outputs "1" to the ID identifier 135A if the absolute value $\Delta IP_n$ is larger than the threshold RSSI_th3.

As such, the method of transmitting each bit value of a wakeup ID at the wakeup signal generator 231A is consistent with the method of bit determination at the bit determiner 133A.

More specifically, the bit determiner 133A outputs the bit value of "0" if the absolute value $\Delta IP_n$ of the difference between the amplitude $IP_n$ and the previous amplitude $IP_{n-1}$ is not more than the threshold RSSI_th3. This corresponds to transmitting a wireless frame indicating the bit value of "0" with the transmission power used for transmitting the previous wireless frame at the wakeup signal generator 231A and wireless communication module 22A. Further, the bit determiner 133A outputs the bit value of "1" if the absolute value $\Delta IP_n$ of the difference between the amplitude $IP_n$ and the previous amplitude $IP_{n-1}$ is larger than the threshold RSSI_th3. This corresponds to transmitting a wireless frame indicating the bit value of "1" with a transmission power different from that used for transmitting the previous wireless frame at the wakeup signal generator 231A and wireless communication module 22A.

Figure 15:
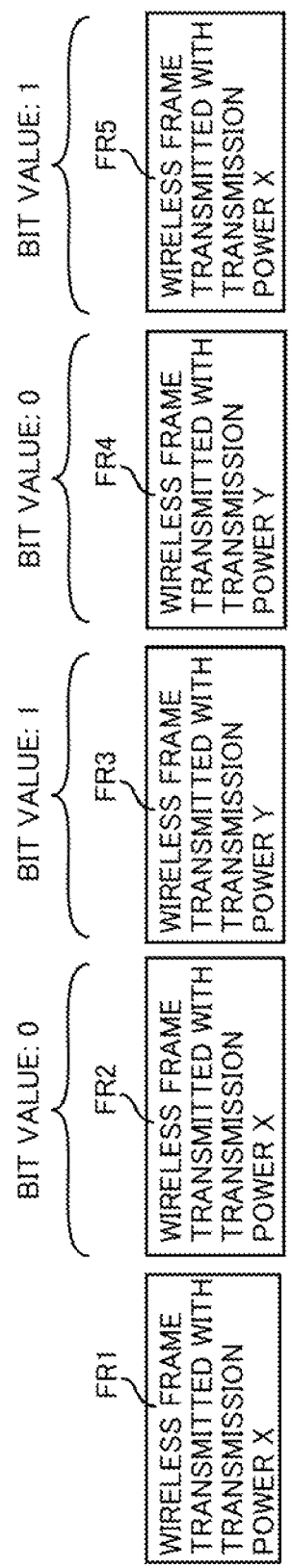
FIG. 15 illustrates a specific example of a method of transmitting a wakeup ID at the wakeup signal generator of FIG. 13.

FIG. 15 illustrates a specific example of a method of transmitting a wakeup ID at the wakeup signal generator 231A of FIG. 13.

Referring to FIG. 15, when a wakeup ID composed of the bit sequence "0101" is to be transmitted, the wireless communication module 22A first transmits a wireless frame FR1 with the transmission power X, then transmits a wireless frame FR2 indicating the bit value of "0" with the same transmission power, X, transmits a wireless frame FR3 indicating the bit value of "1" with a transmission power, Y, which is different from the transmission power X, transmits a wireless frame FR4 indicating the bit value of "0" with the same transmission power, Y, and transmits a wireless frame FR5 indicating the bit value of "1" with the transmission power X, which is different from the transmission power Y.

As such, the bit value of "0" may be transmitted with the transmission power X or the transmission power Y (see the wireless frames FR2 and FR4). Similarly, the bit value of "1" may be transmitted with the transmission power Y or the transmission power X (see the wireless frames FR3 and FR5).

Thus, the transmission powers X and Y are determined such that the difference between the transmission power X and transmission power Y is larger than the threshold RSSI_th3, thereby allowing the each bit value of the bit sequence "0101" to be correctly determined by the bit determiner 133A.

Figure 16:
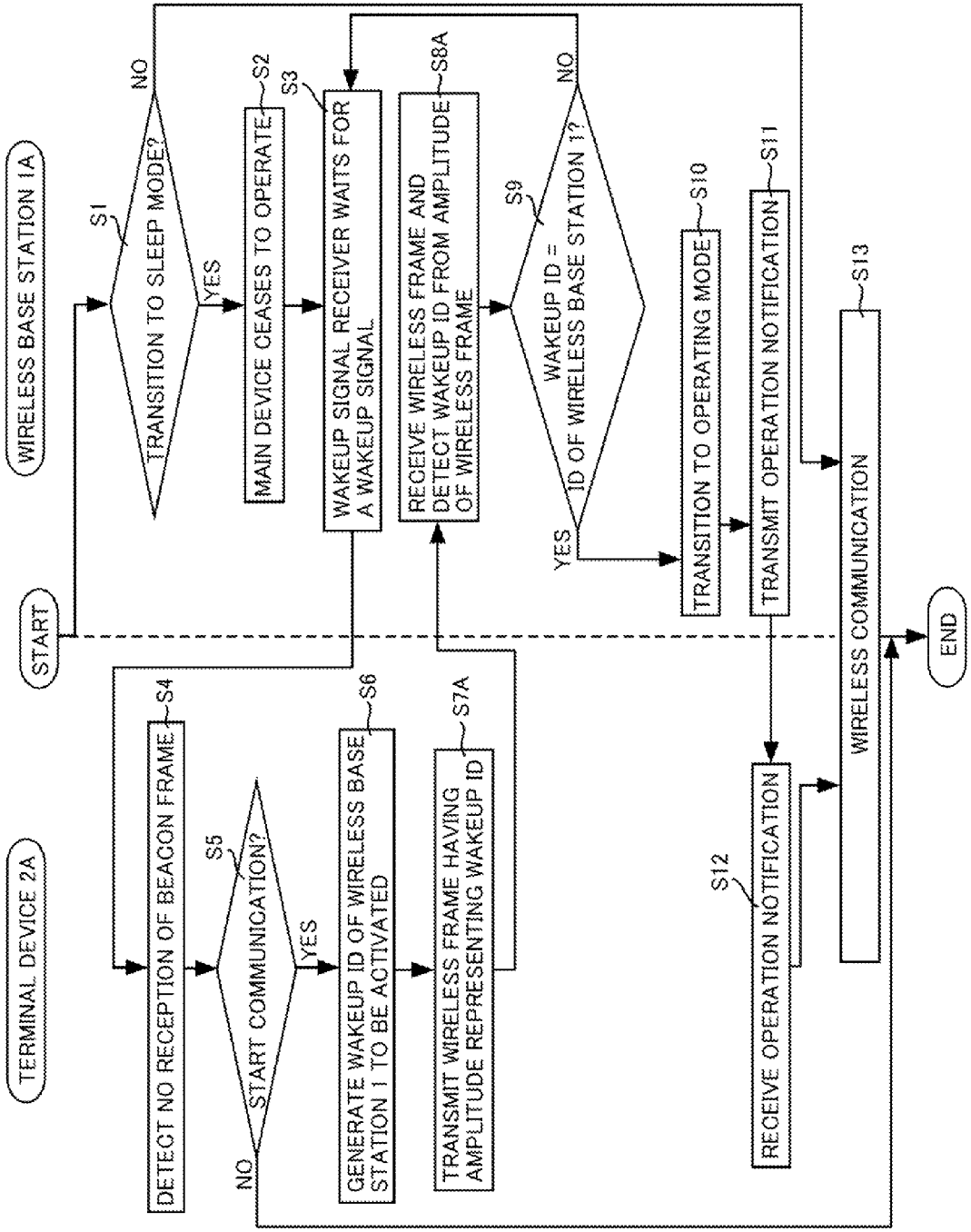
FIG. 16 is a flow chart illustrating how the wireless communication system of FIG. 1 is operated according to Embodiment 2.

FIG. 16 is a flow chart illustrating how the wireless communication system 10 of FIG. 1 is operated according to Embodiment 2.

The flow chart of FIG. 16 is the same as the flow chart of FIG. 10 except that steps S7 and S8 of the flow chart of FIG. 10 are replaced by steps S7A and S8A, respectively.

Referring to FIG. 16, upon initiation of the process, steps S1 to S6 are performed in this order. After step S6, the wakeup signal generator 231A and wireless communication module 22A of the terminal device 2A transmit a wireless frame having an amplitude indicating the wakeup ID via the antenna 21 in the manner discussed above (step S7A).

The wakeup signal receiver 13A of the wireless base station 1A receives the wireless frame via the antenna 11 and detects the wakeup ID from the amplitude of the received wireless frame in the manner discussed above (step S8A).

Thereafter, steps S9 to S13 described above are performed in this order. If it is determined at step S5 that communication is not to be started, or after step S13, the process ends.

As discussed above, in Embodiment 2, the terminal device 2A transmits a wireless frame having an amplitude representing the ID of a wireless base station 1A to be woken up to the wireless base station 1A. Then, the wireless base station 1A detects the wakeup ID from the amplitude of the wireless frame from the terminal device 2A and, if the detected wakeup ID is identical with its own ID, transitions from the sleep mode to the operating mode. In this case, the wireless frame is one under IEEE 802.11.

Thus, the wireless base station 1A may be activated using a wireless frame under IEEE 802.11.

Further, since the wakeup ID is transmitted from the terminal device 2A to the wireless base station 1A and received by the wireless base station 1A using a normal wireless frame, the wireless base station 1A and terminal device 2A requires no special device for transmitting and receiving a wakeup ID, and only one antenna may be needed.

In the description of Embodiment 1, a wireless frame having a frame length that represents a wakeup ID is transmitted from the terminal device 2 to the wireless base station 1, thereby causing the wireless base station 1 to transition from the sleep mode to the operating mode.

In the description of Embodiment 2, a wireless frame having an amplitude that represents a wakeup ID is transmitted from the terminal device 2A to the wireless base station 1A, thereby causing the wireless base station 1A to transition from the sleep mode to the operating mode.

Accordingly, a wireless communication system according to an embodiment of the present invention includes, at least, a terminal device that transmits a wireless frame having a frame length or amplitude that represents a wakeup ID to a wireless base station 1 (or 1A), and a wireless base station that detects the frame length or amplitude of the wireless frame received from the terminal device as the wakeup ID and, if the detected wakeup ID is identical with its own identification information (ID), transitions from the sleep mode to the operating mode.

According to an embodiment of the present invention, the wireless communication module 22 and wakeup signal generator 231 of the terminal device 2 constitute a "wireless module".

According to an embodiment of the present invention, the wireless communication module 22A and wakeup signal generator 231A of the terminal device 2A constitute a "wireless module".

It should be understood that the embodiments disclosed herein are exemplary in every respect and not limiting. It is contemplated that the scope of the present invention is defined by the Claims and not by the above description of the embodiments, and includes all modifications within the spirit and scope equivalent to those of the Claims.

INDUSTRIAL APPLICABILITY

The present invention is applied to terminal devices, wireless base stations that communicate wirelessly with the same, and wireless communication systems that use such terminal devices and wireless base stations.

The invention claimed is:

1. A terminal device comprising:
an antenna;
a wireless module performing wireless communication via the antenna; and
a wakeup transmitter transmitting, in response to a request for start of wireless communication, to a wireless device via the antenna, a wireless frame having a frame length representing identification information of the wireless device to be transitioned from a sleep mode to an operating mode,
wherein the wireless frame is the same wireless frame as that transmitted and received by the wireless module to and from the wireless device,
the sleep mode is a mode in which the wireless device is not capable of wirelessly communicating with the terminal device,
the operating mode is a mode in which the wireless device wirelessly communicates with the terminal device,
a cumulative value representing the frame length of the wireless frame is converted to a bit sequence based on a conversion table in the wireless device, and thereby the frame length of the wireless frame is converted to the bit sequence, and
the converted bit sequence is held on the wireless device and is detected as the identification information of the wireless device.

2. The terminal device according to claim 1, wherein the wireless frame is composed of a management frame or a data frame to be transmitted to a wireless device other than the wireless device or a terminal device other than the terminal device.

3. A wireless communication system comprising:
a terminal device according to claim 1; and a wireless device comprising:
an antenna;
a main device regularly transmitting a second management frame for managing a terminal device, having an operating mode in which it wirelessly communicating with the terminal device and a sleep mode in which it is not capable of wirelessly communicating with the terminal device, and transitioning from the operating mode to the sleep mode when it has not communicated wirelessly with the terminal device in a certain period of time or no terminal device is assigned to the wireless device;
a receiving means receiving a wireless frame via the antenna when the main device is in the sleep mode;
a detecting means detecting a frame length of the wireless frame received by the receiving means;
an identifying means identifying identification information based on the frame length detected by the detecting means; and
an activating means generating, when the identification information identified by the identifying means is identical with identification information of the wireless device, a driving signal for causing the main device to transition from the sleep mode to the operating mode and outputting it to the main device,
wherein, in response to the driving signal, the main device transitions from the sleep mode to the operating mode,
the wireless frame is the same wireless frame as that transmitted and received by the main device to and from the terminal device,
the identifying means converts, upon receiving a cumulative value representing the frame length from the detecting means, the received cumulative value to a bit sequence referring to a conversion table, holds the converted bit sequence, and detects the held bit sequence as the identification information.

4. A wireless communication system comprising:
a terminal device according to claim 1; and a wireless device comprising:
an antenna;
a main device having an operating mode in which it wirelessly communicating with a terminal device which is present in a communication area of the wireless device and a sleep mode in which it is not capable of wirelessly communicating with the terminal device, and transitioning from the operating mode to the sleep mode when it has not communicated wirelessly with the terminal device in a certain period of time or no terminal device is present in the communication area;
a receiving means receiving a wireless frame via the antenna when the main device is in the sleep mode;
a detecting means detecting a frame length of the wireless frame received by the receiving means;
an identifying means identifying identification information based on the frame length detected by the detecting means; and
an activating means generating, when the identification information identified by the identifying means is identical with identification information of the wireless device, a driving signal for causing the main device to transition from the sleep mode to the operating mode and outputting it to the main device,
wherein, in response to the driving signal, the main device transitions from the sleep mode to the operating mode,
the wireless frame is the same wireless frame as that transmitted and received by the main device to and from the terminal device,
the identifying means converts, upon receiving a cumulative value representing the frame length from the detecting means, the received cumulative value to a bit sequence referring to a conversion table, holds the converted bit sequence, and detects the held bit sequence as the identification information.

5. A wireless device comprising:
an antenna;
a main device regularly transmitting a management frame for managing a terminal device, having an operating mode in which it wirelessly communicating with the terminal device and a sleep mode in which it is not capable of wirelessly communicating with the terminal device, and transitioning from the operating mode to the sleep mode when it has not communicated wirelessly with the terminal device in a certain period of time or no terminal device is assigned to the wireless device;
a receiving means receiving a wireless frame via the antenna when the main device is in the sleep mode;
a detecting means detecting a frame length of the wireless frame received by the receiving means;
an identifying means identifying identification information based on the frame length detected by the detecting means; and
an activating means generating, when the identification information identified by the identifying means is identical with identification information of the wireless device, a driving signal for causing the main device to transition from the sleep mode to the operating mode and outputting it to the main device,
wherein, in response to the driving signal, the main device transitions from the sleep mode to the operating mode,
the wireless frame is the same wireless frame as that transmitted and received by the main device to and from the terminal device,
the identifying means converts, upon receiving a cumulative value representing the frame length from the detecting means, the received cumulative value to a bit sequence referring to a conversion table, holds the converted bit sequence, and detects the held bit sequence as the identification information.

6. The wireless device according to claim 5, wherein the cumulative value has a desired width.

7. The wireless device according to claim 5, wherein the wireless frame is composed of the management frame or a data frame to be transmitted to a wireless device other than the wireless device or a terminal device other than the terminal device.

8. The wireless device according to claim 5, wherein if the bit length of the held bit sequence exceeds the length of the identification information of the wireless device, the identifying means discards the oldest bit value in the bit sequence, one after another.

9. The wireless device according to claim 5, wherein if the identification information is represented by n (n is an integer not less than 2) frame lengths of n wireless frames, the detecting means detects n cumulative values $c_1$ to $c_n$ representing the n frame lengths to detect the frame length, and
if the n cumulative values $c_1$ to $c_n$ are input in succession, the identifying means determines that the identification information represented by the n frame lengths is identical with the identification information of the wireless device.

10. The wireless device according to claim 9, wherein if a first cumulative value of n cumulative values $c_1$ to $c_n$ is input, the identifying means performs an operation for waiting a second cumulative value adjacent to the first cumulative value from the cumulative value $c_1$ to the cumulative value $c_n$, and waits, in the operation, the second cumulative value if the first cumulative value is input before a cumulative value other than the first cumulative value is input m (m is an integer not less than 2) times or more.

11. A wireless device comprising:
an antenna;
a main device having an operating mode in which it wirelessly communicating with a terminal device which is present in a communication area of the wireless device and a sleep mode in which it is not capable of wirelessly communicating with the terminal device, and transitioning from the operating mode to the sleep mode when it has not communicated wirelessly with the terminal device in a certain period of time or no terminal device is present in the communication area;
a receiving means receiving a wireless frame via the antenna when the main device is in the sleep mode;
a detecting means detecting a frame length of the wireless frame received by the receiving means;
an identifying means identifying identification information based on the frame length detected by the detecting means; and
an activating means generating, when the identification information identified by the identifying means is identical with identification information of the wireless device, a driving signal for causing the main device to transition from the sleep mode to the operating mode and outputting it to the main device,
wherein, in response to the driving signal, the main device transitions from the sleep mode to the operating mode,
the wireless frame is the same wireless frame as that transmitted and received by the main device to and from the terminal device,
the identifying means converts, upon receiving a cumulative value representing the frame length from the detecting means, the received cumulative value to a bit sequence referring to a conversion table, holds the converted bit sequence, and detects the held bit sequence as the identification information.

12. The wireless device according to claim 11, wherein the cumulative value has a desired width.

13. The wireless device according to claim 11, wherein the wireless frame is composed of a management frame for managing the terminal device or a data frame to be transmitted to a wireless device other than the wireless device or a terminal device other than the terminal device.

14. The wireless device according to claim 11, wherein if the bit length of the held bit sequence exceeds the length of the identification information of the wireless device, the identifying means discards the oldest bit value in the bit sequence, one after another.

15. The wireless device according to claim 11, wherein if the identification information is represented by n (n is an integer not less than 2) frame lengths of n wireless frames, the detecting means detects n cumulative values $c_1$ to $c_n$ representing the n frame lengths to detect the frame length, and
if the n cumulative values $c_1$ to $c_n$ are input in succession, the identifying means determines that the identification information represented by the n frame lengths is identical with the identification information of the wireless device.

16. The wireless device according to claim 15, wherein if a first cumulative value of n cumulative values $c_1$ to $c_n$ is input, the identifying means performs an operation for waiting a second cumulative value adjacent to the first cumulative value from the cumulative value $c_1$ to the cumulative value $c_n$, and waits, in the operation, the second cumulative value if the first cumulative value is input before a cumulative value other than the first cumulative value is input m (m is an integer not less than 2) times or more.

* * * * *